United States Patent
Herman et al.

(10) Patent No.: US 9,100,395 B2
(45) Date of Patent: Aug. 4, 2015

(54) METHOD AND SYSTEM FOR USING A VIBRATION SIGNATURE AS AN AUTHENTICATION KEY

(71) Applicant: International Business Machines Corporation, Armonk, NY (US)

(72) Inventors: Zachary S. Herman, South Weber, UT (US); Randy S. Johnson, O'Fallon, MO (US); John F. Kelley, Clarkesville, GA (US); Tedrick N. Northway, Wood River, IL (US); Kaleb D. Walton, Fenton, MI (US)

(73) Assignee: International Business Machines Corporation, Armonk, NY (US)

( * ) Notice: Subject to any disclaimer, the term of this patent is extended or adjusted under 35 U.S.C. 154(b) by 156 days.

(21) Appl. No.: 14/034,594

(22) Filed: Sep. 24, 2013

(65) Prior Publication Data
US 2015/0089593 A1    Mar. 26, 2015

(51) Int. Cl.
*H04L 29/06* (2006.01)
*H04W 12/06* (2009.01)
*H04B 11/00* (2006.01)

(52) U.S. Cl.
CPC ............ *H04L 63/0853* (2013.01); *H04B 11/00* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 5,005,142 A * | 4/1991 | Lipchak et al. | 702/183 |
| 5,530,963 A * | 6/1996 | Moore et al. | 709/243 |
| 5,539,824 A | 7/1996 | Bjorklund et al. | |
| 6,069,943 A * | 5/2000 | David et al. | 379/202.01 |
| 7,502,933 B2 | 3/2009 | Jakobsson et al. | |
| 7,565,529 B2 | 7/2009 | Beck et al. | |
| 7,836,308 B2 | 11/2010 | Gantman et al. | |
| 7,966,497 B2 * | 6/2011 | Gantman et al. | 713/184 |
| 8,289,936 B2 | 10/2012 | Wang et al. | |
| 8,296,558 B1 * | 10/2012 | Chowdhury | 713/151 |
| 2001/0048744 A1 | 12/2001 | Kimura | |
| 2002/0095580 A1 * | 7/2002 | Candelore | 713/178 |
| 2002/0131574 A1 * | 9/2002 | Alleman | 379/210.01 |
| 2004/0001553 A1 * | 1/2004 | Steentra et al. | 375/260 |

(Continued)

FOREIGN PATENT DOCUMENTS

FR    2655797 A1 *    6/1991    ............ H04M 1/68

OTHER PUBLICATIONS

Salgarelli et al., "Efficient Authentication and Key Distribution in Wireless IP Networks", IEEE Wireless Communications, Dec. 2003, © 2003 IEEE.

(Continued)

*Primary Examiner* — Andrew Nalven
*Assistant Examiner* — Walter Malinowski
(74) *Attorney, Agent, or Firm* — Edward Li

(57) ABSTRACT

A method and computer program product for using a vibration signature as an authentication key to authorize access of a user computer to a network. A vibration device generates a vibration signal of the vibration signature. In one embodiment, a router detects and validates the vibration signal, and then the router starts a session of connecting the user computer to the network. In another embodiment, the user computer decodes the vibration signal of the vibration signature to a security set identifier and a security key, and then sends to a router. In response to validating the security set identifier and the security key, the router starts a session of connecting the user computer to the network.

8 Claims, 4 Drawing Sheets

(56) References Cited

U.S. PATENT DOCUMENTS

| | | | |
|---|---|---|---|
| 2005/0010777 A1* | 1/2005 | Gantman et al. | 713/176 |
| 2005/0038881 A1* | 2/2005 | Ben-Itzhak | 709/223 |
| 2006/0100927 A1* | 5/2006 | Zormati | 705/14 |
| 2006/0155399 A1* | 7/2006 | Ward | 700/94 |
| 2007/0123165 A1* | 5/2007 | Sheynman et al. | 455/41.2 |
| 2010/0082983 A1 | 4/2010 | Shah et al. | |
| 2010/0106222 A1* | 4/2010 | Lychou et al. | 607/60 |
| 2010/0163616 A1* | 7/2010 | Phillips et al. | 235/380 |
| 2010/0293378 A1 | 11/2010 | Xiao et al. | |
| 2011/0086712 A1* | 4/2011 | Cargill | 463/42 |
| 2012/0069792 A1* | 3/2012 | Kishida | 370/315 |
| 2012/0171963 A1* | 7/2012 | Tsfaty | 455/41.3 |
| 2012/0174150 A1* | 7/2012 | Reddy et al. | 725/31 |
| 2012/0197556 A1* | 8/2012 | Manoosingh et al. | 702/56 |
| 2012/0330734 A1* | 12/2012 | Brown et al. | 705/14.5 |
| 2013/0067081 A1* | 3/2013 | Liu et al. | 709/225 |
| 2013/0067544 A1 | 3/2013 | Kwark et al. | |
| 2013/0069772 A1* | 3/2013 | Najafi et al. | 340/407.1 |
| 2013/0241468 A1* | 9/2013 | Moshfeghi | 320/107 |
| 2014/0029858 A1* | 1/2014 | Tung | 382/218 |
| 2014/0059347 A1* | 2/2014 | Dougherty et al. | 713/168 |
| 2014/0106709 A1* | 4/2014 | Palamara et al. | 455/411 |
| 2014/0369169 A1* | 12/2014 | Iida et al. | 367/135 |
| 2015/0059480 A1* | 3/2015 | Dockrey et al. | 73/649 |
| 2015/0065199 A1* | 3/2015 | Shah et al. | 455/563 |
| 2015/0098308 A1* | 4/2015 | Herman et al. | 367/197 |

OTHER PUBLICATIONS

Saxena, et al., "Vibrate-to-Unlock: Mobile Phone Assisted User Authentication to Multiple Personal RFID Tags", 2011 IEEE International Conference on Pervasive Computing and Communications (PerCom), Seattle, Mar. 21-25, 2011, pp. 181-188, © 2011 IEEE.

"Easy wifi autoconfiguration with barcodes", I Still Know What You Learned Last Summer, printed Jul. 13, 2013, <http://psung.blogspot.com/2010/12/easy-wifi-autoconfiguration-with.html[Jul. 17, 2013 11:07:13 AM]>.

* cited by examiner

METHOD AND SYSTEM FOR USING A VIBRATION SIGNATURE AS AN AUTHENTICATION KEY

FIELD OF THE INVENTION

The present invention relates generally to authentication of computer network access, and more particularly to a method and system for using a vibration signature as an authentication key.

BACKGROUND

The access authentication promotes information sharing among authorized users and prohibits others from accessing the information. Particularly, in a session for a user to a use a local network via WIFI, the entry of a security key by the user is not always an easy and user-friendly way; furthermore, the security key left in the computer after the session may allow the user without authorization to access other sessions. There exist some solutions. In a first solution, a flash drive may be distributed to authorized users; the flash drive is with preconfigured network settings or a text file containing a password. With the first solution, a computer or other electronic device must have a USB drive, and flash drive data can be easily copied. In a second solution, two-dimensional barcode may be used for a user to scan for the purpose of authentication. With the second solution, a computer or other electronic device must have a camera; in addition, a picture of the two-dimensional barcode can be easily taken and distributed without authorization. In a third solution, near field communication (NFC) may be used for a user to be authenticated by bringing a computer to proximity of a router; wherein both the computer and the router must be NFC enabled. With the third solution, the user must bring the computer close enough to the router. Under the situation of multiple users, the third solution is unsuitable and inconvenient.

SUMMARY

Embodiments of the present invention provide a method and computer program product for using a vibration signature as an authentication key to authorize access of a user computer to a network. In one of the embodiments, at least one computer program on a router invokes the router to listen to a vibration signal of the vibration signature from a device attached on the user computer, wherein the device generates the vibration signal of the vibration signature. The at least one computer program on the router receives the vibration signal of the vibration signature from the device and validates the vibration signature. The at least one computer program on the router starts a session of connecting the user computer to the network through the router, in response to determining that the vibration signature is authorized.

In another one of embodiments, at least one computer program on a router activates a vibration device to emit a vibration signal of the vibration signature. At least one program on a user computer decodes the vibration signal to a security set identifier and a security key, in response to receiving the vibration signal from the vibration device. The at least one program on the user computer sends the security set identifier and the security key to the router. The at least one computer program on the router validates the security set identifier and the security key. The at least one computer program on the router starts a session of connecting the user computer to the network through the router, in response to determining that the security set identifier and the security key are authorized.

DETAILED DESCRIPTION

Figure 1:
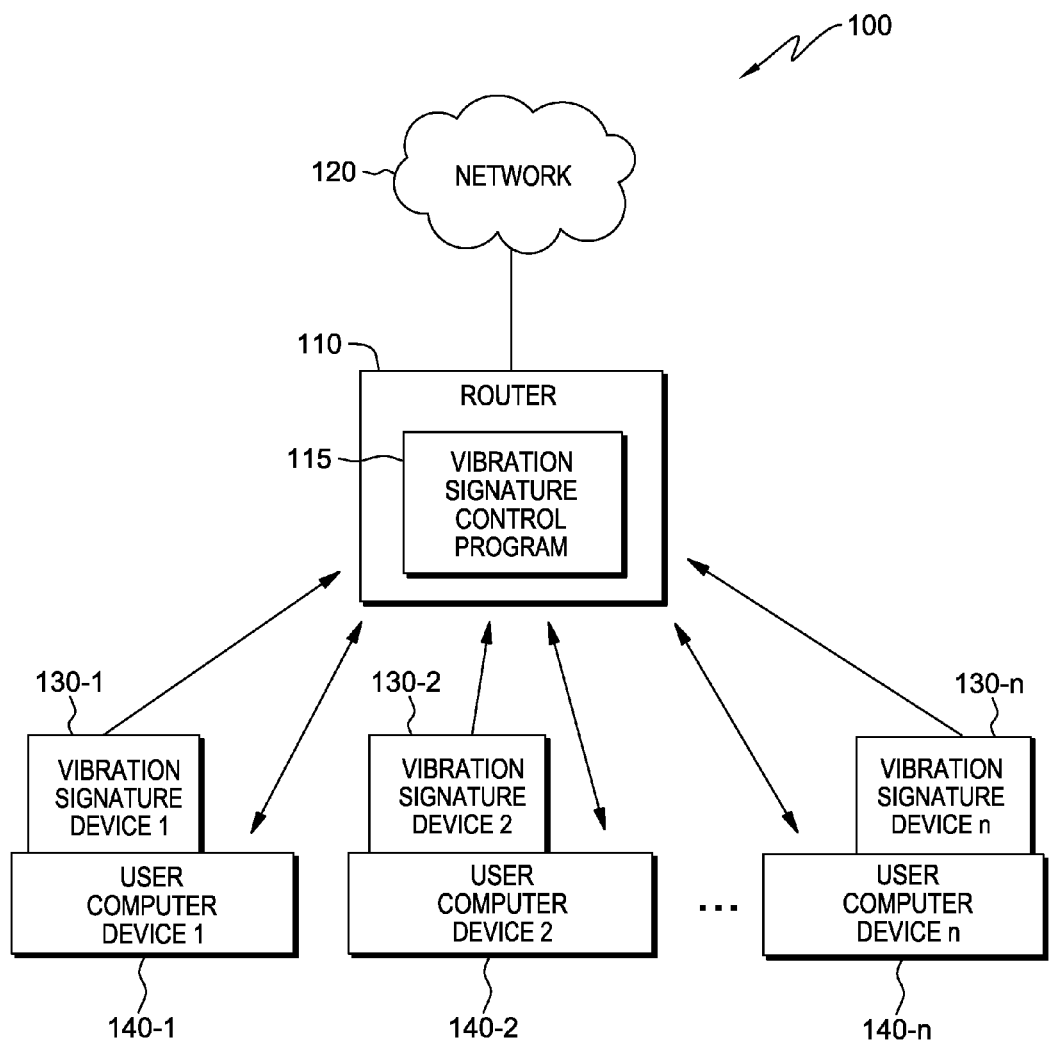
FIG. 1 is a diagram illustrating a system for using a vibration signature as an authentication key, in accordance with a first exemplary embodiment of the present invention.

FIG. 1 is a diagram illustrating system 100 for using a vibration signature as an authentication key, in accordance with a first exemplary embodiment of the present invention. System 100 includes router 110 and a plurality of user computer devices, user computer devices 140-1 through 140-n. Router 110 provides access to network 120 for user computer devices 140-1 through 140-n. In the first exemplary embodiment, router 110 provides a wireless access point for user computer devices 140-1 through 140-n.

In the first exemplary embodiment, system 100 further includes vibration signature devices 130-1 through 130-n which are attached onto user computer devices 140-1 through 140-n, respectively. In the first exemplary embodiment, vibration signature devices 130-1 through 130-n generate vibration signals of a vibration signature. The vibration signature is used by router 110 to authenticate computer devices 140-1 through 140-n. In other embodiments, a vibration signal is emitted by a vibration emitter built in a router. The signals of the vibration signature are detected by router 110. For example, router 110 may receive the vibration signals of the vibration signature through a microphone device or an accelerometer which can be used for vibration measurement.

In system 100 of the first exemplary embodiment, router 110 comprises vibration signature control program 115. Vibration signature control program 115 invokes router 110 to listen to vibration signature devices 130-1 through 130-n, receives the vibration signals of the vibration signature from vibration signature devices 130-1 through 130-n. Vibration signature control program 115 validates the vibration signature and then allow user computer devices 140-1 through 140-n to access network 120.

A respective one of user computer devices 140-1 through 140-n may be a desktop computer, a notebook/laptop computer, a tablet computer, a smartphone, a thin client, or any other computing device capable of receiving and sending data. Network 120 may be an intranet, a local area network (LAN), a wide area network (WAN), or Internet. Network 120 may include wired, wireless, or fiber optic connections.

Figure 2:
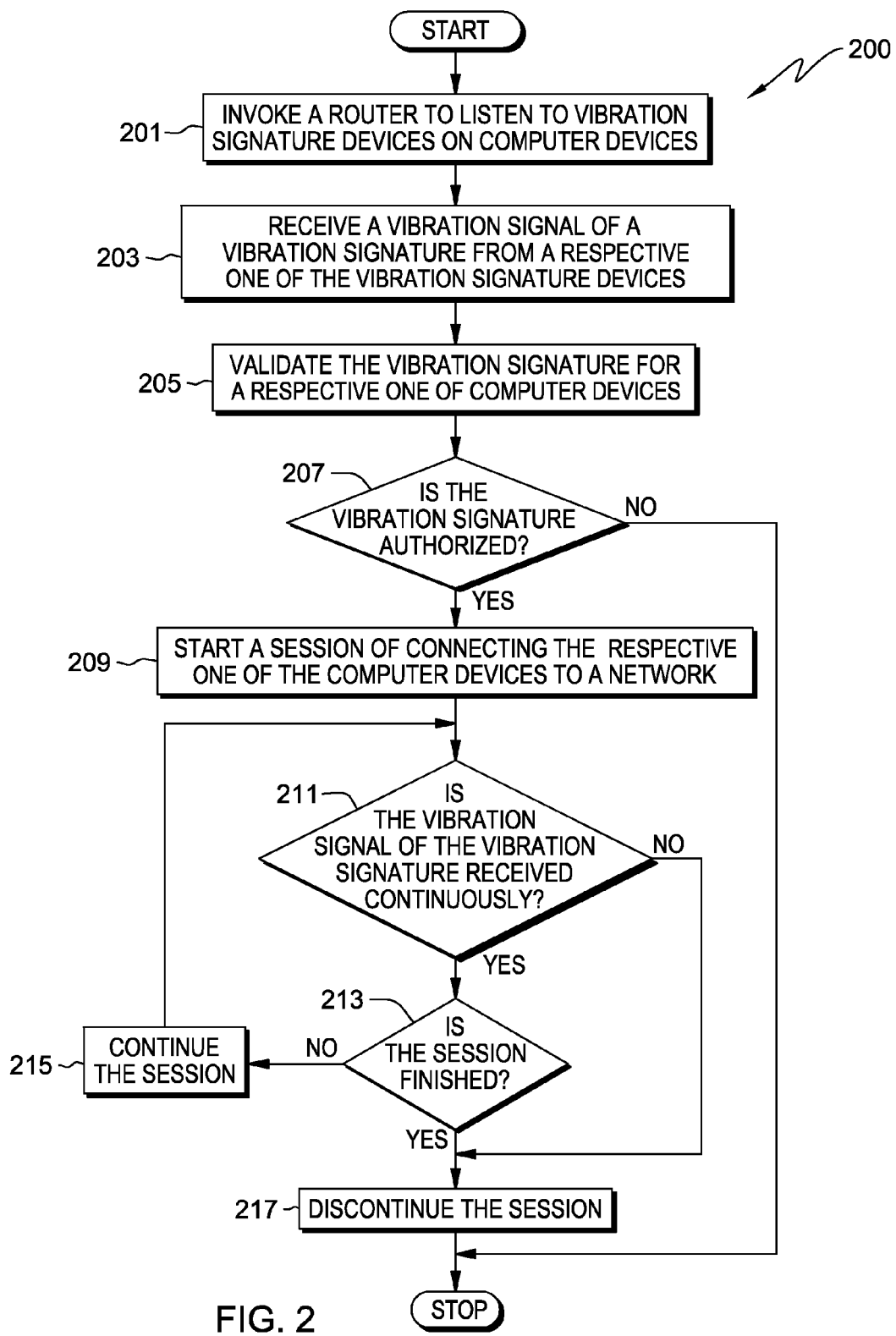
FIG. 2 is a flowchart illustrating operational steps of using a vibration signature as an authentication key in the system shown in FIG. 1, in accordance with a first exemplary embodiment of the present invention.

FIG. 2 is flowchart 200 illustrating operational steps of using a vibration signature as an authentication key in system 100 shown in FIG. 1, in accordance with a first exemplary embodiment of the present invention. In the first exemplary embodiment, the operational steps in flowchart 200 are implemented by vibration signature control program 115 on router 110 which are shown in FIG. 1.

Referring to FIG. 2, at step 201, vibration signature control program 115 on router 110 invokes router 110 to listen to vibration signature devices 130-1 through 130-n which are attached respectively onto user computer devices 140-1 through 140-n. Router 110 detects vibration signals of the vibration signature generated by vibration signature devices 130-1 through 130-n. For example, router 110 detects the vibration signals of the vibration signature through a microphone device or an accelerometer.

At step 203 in FIG. 2, vibration signature control program 115 receives a vibration signal of the vibration signature from a respective one of signature devices 130-1 through 130-n. The respective one of signature devices 130-1 through 130-n is attached onto a respective one of user computer devices 140-1 through 140-n.

At step 205 in FIG. 2, vibration signature control program 115 validates the vibration signature for the respective one of user computer devices 140-1 through 140-n, in response to receiving the vibration signature from the respective one of signature devices 130-1 through 130-n. At decision block 207, vibration signature control program 115 determines whether the vibration signature is authorized.

In response to determining that the vibration signature is not authorized ("NO" branch of decision block 207), vibration signature control program 115 terminates. In response to determining that the vibration signature is authorized ("YES" branch of decision block 207), at step 209, vibration signature control program 115 starts a session of connecting the respective one of user computer devices 140-1 through 140-n to network 120.

After the respective one of user computer devices 140-1 through 140-n is connected to network 120, at decision block 211, vibration signature control program 115 determines whether the vibration signal of the vibration signature is continuously received by router 120. In response to determining that the vibration signal of the vibration signature is not received continuously ("NO" branch of decision block 211), vibration signature control program 115, at step 217, discontinues the session of connecting the respective one of user computer devices 140-1 through 140-n to network 120. For example, the respective one of user computer devices 140-1 through 140-n is out of the range so that the vibration signal can not be detected by router 110; therefore, vibration signature control program 115 discontinues the session.

In response to determining that the vibration signal of the vibration signature is received continuously ("YES" branch of decision block 211), vibration signature control program 115, at decision block 213, determines whether the session of connecting the respective one of user computer devices 140-1 through 140-n to network 120 is finished. In response to determining that the session is finished ("YES" branch of decision block 213), vibration signature control program 115, at step 217, discontinues the session of connecting the respective one of user computer devices 140-1 through 140-n to network 120. In response to determining that the session is not finished ("NO" branch of decision block 213), vibration signature control program 115 continues the session and then reiterates from decision block 211.

Figure 3:
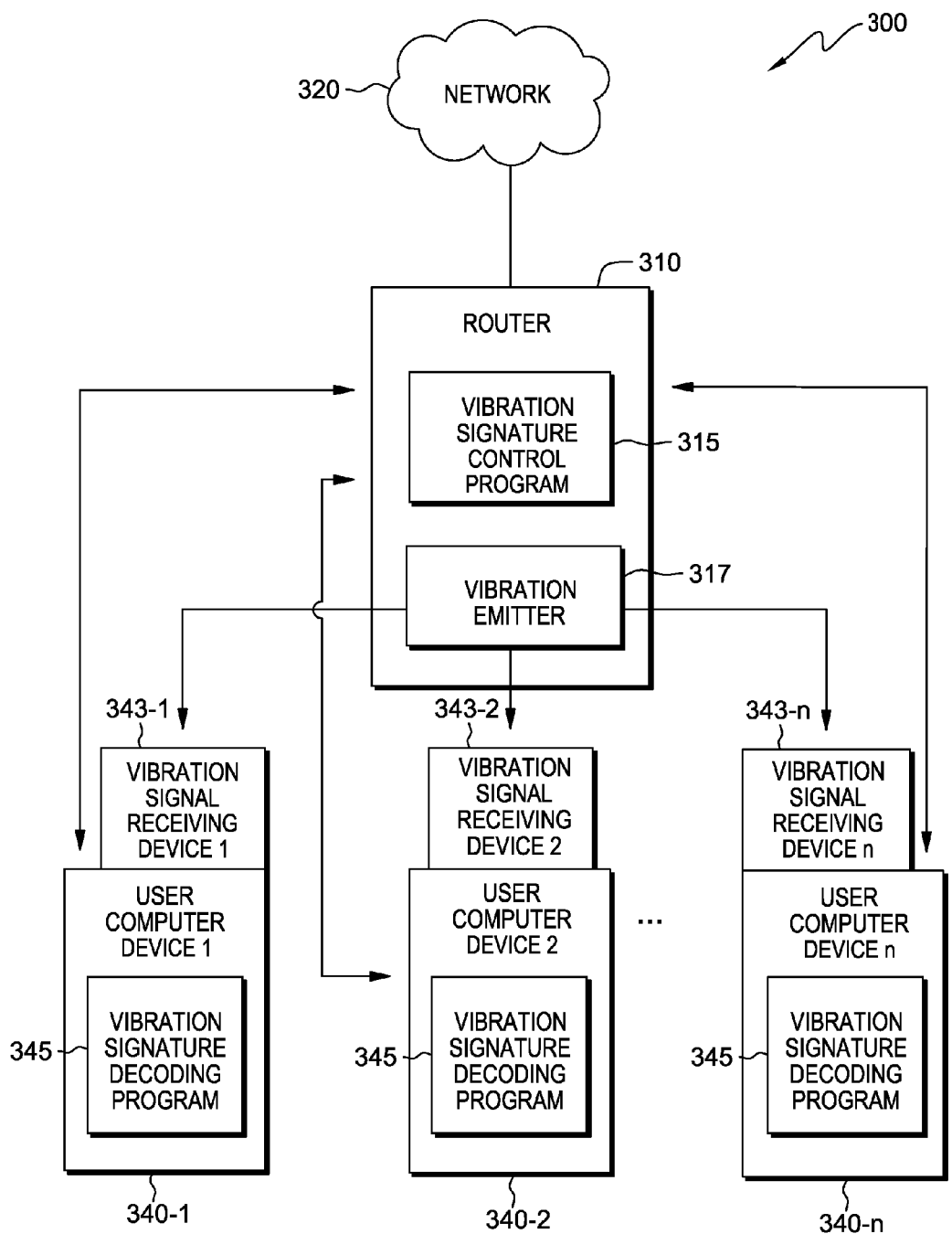
FIG. 3 is a diagram illustrating a system for using a vibration signature as an authentication key, in accordance with a second exemplary embodiment of the present invention.

FIG. 3 is a diagram illustrating system 300 for using a vibration signature as an authentication key, in accordance with a second exemplary embodiment of the present invention. System 300 includes router 310 and a plurality of user computer devices, user computer devices 340-1 through 340-n. Router 310 provides access to network 320 for user computer devices 340-1 through 340-n. In the second exemplary embodiment, router 320 provides a wireless access point for user computer devices 340-1 through 340-n.

In the second exemplary embodiment, router 310 includes vibration signature control program 315 and vibration device 317. Vibration signature control program 315 activates vibration device 317 to send a vibration signal of a vibration signature, receives a security set identifier (SSID) and a security key from user computer devices 340-1 through 340-n. The SSID and the security key are generated by user computer devices 340-1 to 340-n through decoding the vibration signal of the vibration signature. Vibration signature control program 315 validates the SSID and the security key and then allow user computer devices 340-1 through 340-n to access network 320. Vibration device 317 emits a persistent and repetitious vibration signal of the vibration signature. The vibration signature is used by router 310 to authenticate user computer devices 340-1 through 340-n. The vibration signal is emitted by a built-in vibration device in the second exemplary embodiment; however, in other embodiments, the vibration signal can be emitted from a stand-alone vibration device which is separated from a router.

Referring to FIG. 3, system 300 further includes vibration signal receiving devices 343-1 through 343-n. Vibration signal receiving devices 343-1 through 343-n may be incorporated into computer devices 340-1 through 340-n, respectively. Alternatively, vibration signal receiving devices 343-1 through 343-n may be separate devices which are attached onto user computer devices 340-1 through 340-n, respectively. Vibration signal receiving devices 343-1 through 343-n receive the vibration signal sent out by vibration device 317. For example, microphone devices or accelerometers can be used as vibration signal receiving devices 343-1 through 343-n. In the second exemplary embodiment, each of user computer devices 340-1 through 340-n includes vibration signature decoding program 345. Vibration signature decoding program 345 decodes the vibration signal to the SSID and the security key, and sends the SSID and the security key to router 310.

Figure 4:
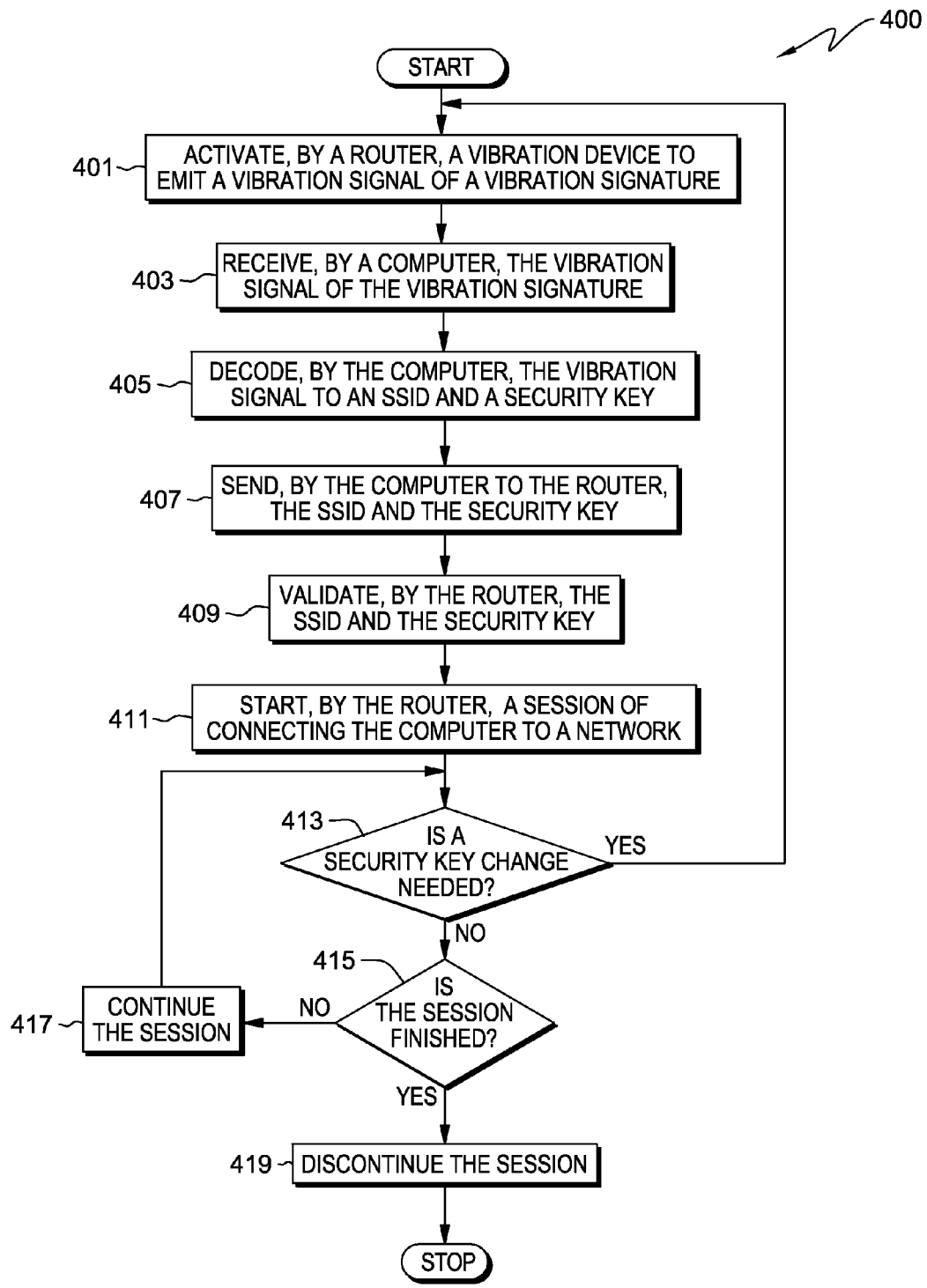
FIG. 4 is a flowchart illustrating operational steps of using a vibration signature as an authentication key in the system shown in FIG. 3, in accordance with a second exemplary embodiment of the present invention.

FIG. 4 is flowchart 400 illustrating operational steps of using a vibration signature as an authentication key in system 300 shown in FIG. 3, in accordance with a second exemplary embodiment of the present invention. In the second exemplary embodiment, the operational steps in flowchart 400 are implemented by vibration signature control program 315 on router 310 (shown in FIG. 3) and vibration signature decoding program 345 on user computer devices 340-1 through 340-n (shown in FIG. 3).

Referring to FIG. 4, at step 401, vibration signature control program 315 on router 310 activates vibration device 317 to emit a vibration signal of a vibration signature. Vibration device 317 emits a persistent and repetitious vibration signal of the vibration signature, which is used by router 310 to authenticate user computer devices 340-1 through 340-n. The vibration signal can be received by vibration signal receiving devices 343-1 through 343-n which are attached onto user computer devices 340-1 through 340-n, respectively.

Referring to FIG. 4, at step 403, vibration signature decoding program 345 on a respective one of user computer devices 340-1 through 340-n receives the vibration signal. At step 405, vibration signature decoding program 345 on the respective one of user computer devices 340-1 through 340-n decodes the vibration signature to a security set identifier (SSID) and a security key. The SSID and the security key are used to authenticate user computer devices 340-1 through 340-n. At step 407, vibration signature decoding program 345 on the respective one of user computer devices 340-1 through 340-n sends the SSID and the security key to router 310.

Referring to FIG. 4, at step 409, vibration signature control program 315 on router 310 validates the SSID and the security key, which are sent at step 407 by vibration signature decoding program 345 on the respective one of user computer devices 340-1 through 340-*n*. At step 411, vibration signature control program 315 on router 310 starts a session of connecting the respective one of user computer devices 340-1 through 340-*n* to network 320, in response to determining that the vibration signature is authorized.

Referring to FIG. 4, at decision block 413, vibration signature control program 315 on router 310 determines whether a security key change is needed. In response to determining that the security key change is needed ("YES" branch of decision block 413), vibration signature control program 315 on router 310 reiterates from step 401. Thus, vibration signature control program 315 on router 310 activates vibration device 317 to emit a vibration signal of a new vibration signature. In response to determining that the security key change is not needed ("NO" branch of decision block 413), vibration signature control program 315 on router 310, at decision block 415, determines whether the session of connecting the respective one of user computer devices 340-1 through 340-*n* to network 320 is finished. In response to determining that the session is finished ("YES" branch of decision block 415), vibration signature control program 315 on router 310, at step 419, discontinues the session. In response to determining that the session is not finished ("NO" branch of decision block 415), vibration signature control program 315 on router 310, at step 417, continues the session and then reiterates from decision block 413.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.), or an embodiment combining software and hardware aspects that may all generally be referred to herein as a "circuit", "module", or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by, or in connection with, an instruction execution system, apparatus, or device.

Program code embodied on a computer readable medium may be transmitted using any appropriate medium including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method of using a vibration signature as an authentication key to authorize access of a user computer to a network, the method implemented by at least one computer program on a router, the method comprising:
    invoking the router to listen to a vibration signal of the vibration signature from a device attached on the user computer, wherein the device generates the vibration signal of the vibration signature;
    receiving the vibration signal of the vibration signature from the device;
    validating the vibration signature;
    starting a session of connecting the user computer to the network through the router, in response to determining that the vibration signature is authorized;
    determining whether the vibration signal of the vibration signature is continuously received by the router;
    discontinuing the session of connecting the user computer to the network through the router, in response to determining that the vibration signal of the vibration signature is not continuously received by the router; and
    continuing the session of connecting the user computer to the network through the router, in response to determining that the vibration signal of the vibration signature is continuously received by the router.

2. The method of claim 1, further comprising:
    determining whether the session of connecting the user computer to the network through the router is finished;
    discontinuing the session of connecting the user computer to the network through the router, in response to determining that the session is finished; and
    continuing the session of connecting the user computer to the network through the router, in response to determining that the session is not finished.

3. The method of claim 1, wherein the router detects the vibration signal of the vibration signature by a vibration signal receiving device.

4. The method of claim 3, wherein the vibration signal receiving device is a microphone or an accelerometer.

5. A computer program product for using vibration signature as an authentication key to authorize access of a user computer to a network, the computer program product comprising a computer readable storage medium having program code embodied therewith, the program code executable to:
    invoke a router to listen to a vibration signal of the vibration signature from a device attached on the user computer, wherein the device generates the vibration signal of the vibration signature;
    receive the vibration signal of the vibration signature from the device;
    validate the vibration signature;
    start a session of connecting the user computer to the network through the router, in response to determining that the vibration signature is authorized;
    determine whether the vibration signal of the vibration signature is continuously received by the router;
    discontinue the session of connecting the user computer to the network through the router, in response to determining that the vibration signal of the vibration signature is not continuously received by the router; and
    continue the session of connecting the user computer to the network through the router, in response to determining that the vibration signal of the vibration signature is continuously received by the router.

6. The computer program product of claim 5, further comprising the program code executable to:
    determine whether the session of connecting the user computer to the network through the router is finished;
    discontinue the session of connecting the user computer to the network through the router, in response to determining that the session is finished; and
    continue the session of connecting the user computer to the network through the router, in response to determining that the session is not finished.

7. The computer program product of claim 5, wherein the router listens to the vibration signal of the vibration signature by a vibration signal receiving device.

8. The computer program product of claim 7, wherein the vibration signal receiving device is a microphone or an accelerometer.

* * * * *